United States Patent [19]

Kish et al.

[11] 3,915,480

[45] Oct. 28, 1975

[54] PULLOUT RESISTANT PIPE COUPLING MEMBER AND GASKETS THEREFOR

[75] Inventors: George D. Kish, Derrick City; Gerald B. Smith, Bradford, both of Pa.

[73] Assignee: Dresser Industries, Inc., Dallas, Tex.

[22] Filed: June 27, 1974

[21] Appl. No.: 483,491

Related U.S. Application Data

[63] Continuation of Ser. No. 302,616, Oct. 31, 1972, abandoned.

[52] U.S. Cl. ............. 285/174; 277/235 R; 285/256; 285/369; 285/382
[51] Int. Cl.² ........................................ F16L 13/14
[58] Field of Search ............. 285/96, 104, 105, 256, 285/382.2, 381.1, 382, 348, 113, 97, 174, 323, 321, 174, 369; 277/235 R

[56] References Cited

UNITED STATES PATENTS

| | | | |
|---|---|---|---|
| 870,428 | 11/1907 | Graham | 277/235 R |
| 2,005,056 | 6/1935 | Stephens | 285/104 X |
| 2,283,975 | 5/1942 | Dillon | 285/104 |
| 2,613,086 | 10/1952 | Wolfram | 285/348 X |
| 3,248,135 | 4/1966 | Meripol | 285/323 |
| 3,429,587 | 2/1969 | Kish | 285/96 X |
| 3,477,750 | 11/1969 | Powell | 285/382 X |
| 3,582,112 | 6/1971 | Pico | 285/96 |
| 3,815,940 | 6/1974 | Luckenbill | 285/105 |
| 3,838,205 | 9/1974 | Kish | 285/382 X |

FOREIGN PATENTS OR APPLICATIONS

| | | | |
|---|---|---|---|
| 1,235,691 | 3/1967 | Germany | 285/105 |

*Primary Examiner*—Thomas F. Callaghan
*Attorney, Agent, or Firm*—Daniel Rubin

[57] ABSTRACT

A gasketed pipe coupling member affording pipe pullout resistance of a magnitude at least comparable to the draw-bar pull forces associated with pipe of plastic composition. Circumferentially extending gripping members having serrated gripping surfaces which are geometrically different for metal versus plastic pipe are provided in conjunction with an elastomer comprising the gasket. Forming the coupled joint by deforming the coupling member obtains the required sealing force between the gasket elastomer and contained pipe section. Concomitantly obtained is a highly pullout resistant gripping relation between each gripping member and the respective pipe section coupled thereat.

10 Claims, 12 Drawing Figures

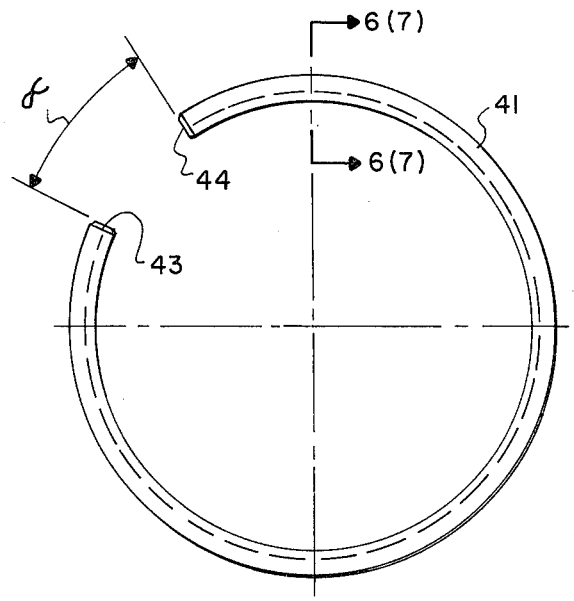
FIG. 5
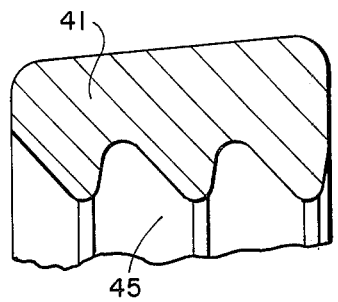
FIG. 6
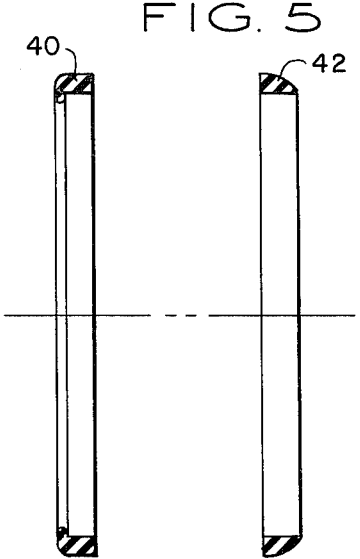
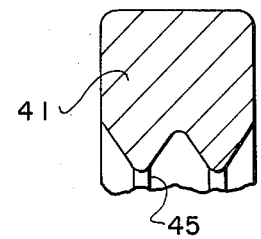
FIG. 7
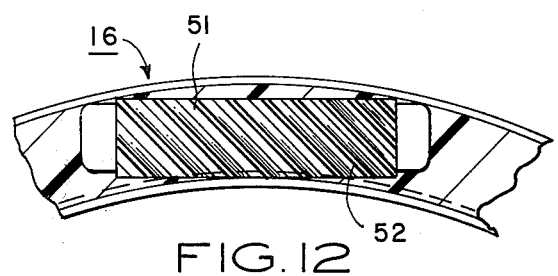
FIG. 12
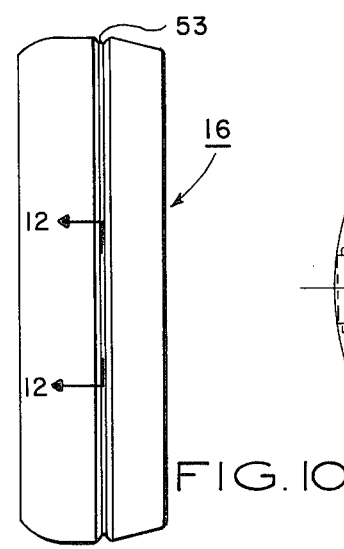
FIG. 8  FIG. 9
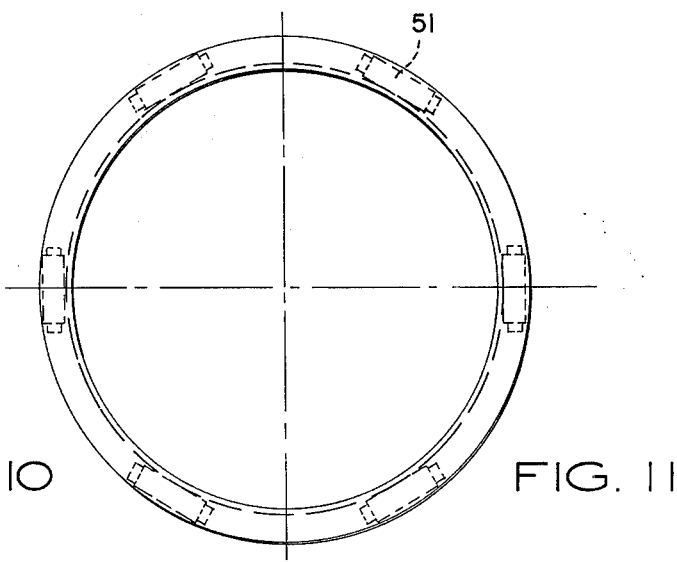
FIG. 10  FIG. 11

PULLOUT RESISTANT PIPE COUPLING MEMBER AND GASKETS THEREFOR

CROSS-REFERENCE TO RELATED APPLICATIONS

This is a continuation, of application Ser. No. 302,616 filed Oct. 31, 1972 and now abandoned.

Application Ser. No. 56,178 filed July 9, 1970 now Pat. No. 3,838,205 and entitled "Electrically Conductive Pipe Coupling Gasket" (hereinafter CR-1) and application Ser. No. 153,871 filed June 16, 1971 and now abandoned and entitled "Swagable Pipe Coupling" (hereinafter CR-2).

BACKGROUND OF THE INVENTION

1. The art to which the invention pertains includes the art of piping and pipe couplings for the formation of pipe joints.

2. The use of couplings and the like for forming pipe joints is well known. It is likewise well known to employ gripping members of sorts in association with the gasket in order to prevent in-service uncoupling of the joint by longitudinal draw-bar forces imposed on the coupled pipe sections. Exemplifying the latter for use with metal piping is a coupling gasket construction disclosed in Miller U.S. Pat. No. 2,201,372.

With the advent of plastic pipe and tubing in their approval by regulating agencies for natural gas transmission, the previous problem of pipe pullout from a coupled joint is increased many times over to on the order of ten fold. One factor most contributing to this problem is the much greater linear coefficient of thermal expansion for plastic pipe as compared to steel pipe. By way of example, Aldyl "A" polyethylene piping marketed by Dupont has a linear coefficient of thermal expansion stated by the manufacturer to be $9 \times 10^{-5}$ in./in.F° as compared to $6.5 \times 10^{-6}$ in./in.F° for steel pipe. Notwithstanding, Government agencies regulating installation of such systems require that ". . .each joint will sustain the longitudinal pullout or thrust forces caused by contraction or expansion of the piping or by anticipated external or internal loading," while limiting design pressure for plastic pipe to "not exceed 100 psig" (Title 49, Section 192 "Transportation of Natural and Other Gas by Pipeline-Minimum Safety Regulations" — Fed. Reg., Vol. 35, No. 161).

It can be readily appreciated with the foregoing in mind that meeting these Government code standards where one or both of the pipe sections are of a plastic composition has imposed substantially more severe requirements on the joint formation than previously encountered with conventional metal pipe. Not only must each pipe section be retained by the coupling in opposition to longitudinally imposed draw forces without literally being torn away, but they must be so retained to the extend that failure from these imposed forces will of necessity occur elsewhere in the system removed from the joint. Moreover, it is desirable and sometimes mandatory in a transitional coupling, i.e., joinder of a plain end metal to a plain end plastic pipe section, that at least the coupled metal pipe continue to be characterized by articulation in order to accommodate in-service deflection.

As might be expected, previous gripping devices employed for coupling steel pipe are either inadequate and/or unreliable for withstanding the increased pullout forces associated with coupling of plastic pipe.

SUMMARY OF THE INVENTION

The invention relates to pipe couplings and gaskets therefor. More specifically, the invention relates to pipe couplings able to exert increased holding power against the pipe sections coupled thereby with a gripping force at least greater than the magnitudes of longitudinal draw-bar forces contemplated with pipe of plastic composition. Not only is adequate gripping force by means hereof applied against both coupled pipe sections even though only one may be of plastic but at the same time the manner of exerting the force is constrained as so not to unduly constrict or crush the plastic pipe end whereby pullout could otherwise occur.

In accordance herewith, the foregoing is achieved utilizing previously available coupling members of the deformable type. Each employs a cylindrical shell internally defining an annular recess to accommodate a gasket member and different gasket constructions are employed for plastic vs. metal pipe. For plastic pipe the gasket is comprised of three loosely assembled contiguously tandem segments used in combination with a ferruled metal sleeve inserted in the pipe end radially opposite the gasket. The axially outer segments comprise elastomeric rings of cross-section adapted to the coupling recess. The middle segment on the other hand is inelastic, preferably of metal, and of predetermined circumferential extent having a more or less sinuous, unsharp, serrated gripping surface on its radially inner face able to penetrate the plastic pipe surface when constricted thereagainst. For metal pipe, the gasket is an integral unit predominantly of elastomer and likewise cross-sectioned in adaptation to the coupling recess. Internally of the latter gasket extending in a more or less circumferential direction are a plurality of angularly displaced roller-type gripping members. Each gripping roller is generally linear with longitudinal sharp teeth on its periphery able to tightly bind on coupling deformation between the pipe wall and coupling wall thereat.

With these components it has been found that sufficient pipe gripping force is provided to the coupled joint in excess of code requirement. By means of a relatively inexpensive construction therefore, the prior problem of meeting code requirements with plastic pipe is simply, yet effectively resolved.

It is therefore an object of the invention to provide a novel pipe coupling affording substantially greater pipe pullout resistance than similar purpose couplings of the prior art.

It is a further object of the invention to provide a novel pipe coupling able to retain coupled pipe against longitudinal draw-bar pull forces of the magnitude contemplated with plastic pipe.

It is a further object of the invention to provide a novel pipe coupling in accordance with the foregoing objects able to restrain plastic pipe against pullout pursuant to code requirements without crushing or otherwise destroying the pipe end.

It is a yet further object of the invention to provide a novel pipe coupling able to achieve the objectives of the foregoing objects with a relatively simple inexpensive construction so as not to render the coupling prohibitively costly as compared to such similar purpose couplings of the prior art.

3

It is a still further object of the invention to provide novel gasket constructions to achieve pipe gripping in the couplings of the foregoing objects.

BRIEF DESCRIPTION OF THE DRAWINGS

FIG. 5 is a front elevation view of the gasket gripping ring for plastic pipe;

FIG. 6 is an enlarged sectional elevation taken substantially along the lines 6—6 of FIG. 5 for the first coupling member embodiment hereof;

FIG. 7 is an enlarged sectional elevation taken substantially along the lines 7—7 of FIG. 5 for the second coupling member embodiment hereof;

FIGS. 8 and 9 are sectional elevations through the elastomeric segments associated with the ring of FIG. 5;

FIG. 10 is an external side elevation of the gasket constructionn for metal pipe;

FIG. 11 is a front elevation of the gasket of FIG. 10; and

FIG. 12 is an enlarged sectional view taken substantially along the lines 12—12 of FIG. 10.

Before undertaking the detailed description to follow, it is to be understood at the onset that the terms "plastic pipe" and "plastic tubing" are frequently used interchangeably in the trade. Therefore, despite distinctions set forth in ASTM Standard D2513-68, as hereinafter used, the term "pipe" shall be interpreted to include "tubing" to the extent to which the invention here is applicable thereto and not otherwise specifically excluded. Preferred use for the invention is with plastic pipe having wall thicknesses of 3/16 inches and heavier.

Figure 1:
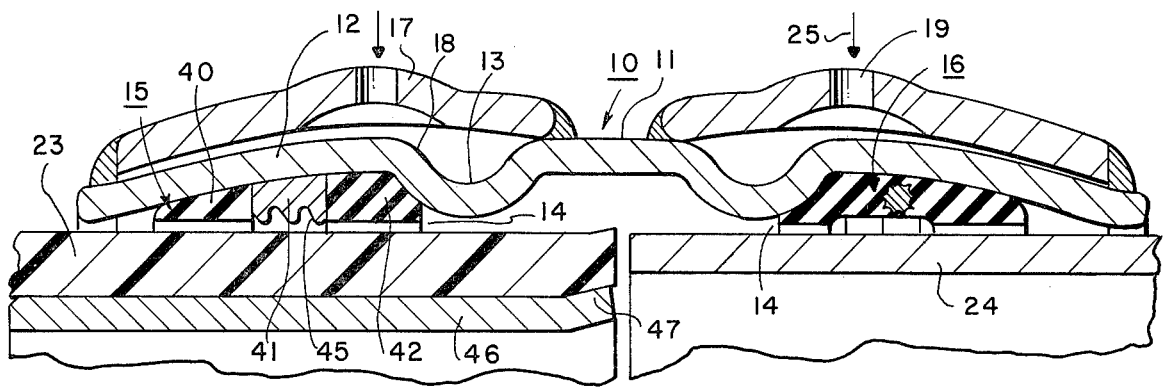
FIGS. 1 and 2 are before and after forming the coupled joint respectively for a first embodiment coupling member in accordance herewith.
Figure 2:
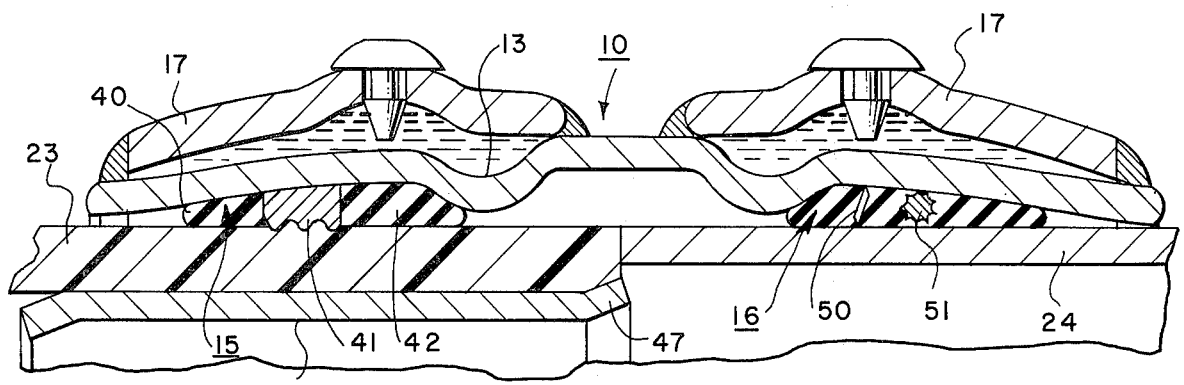

Referring now to FIGS. 1 and 2 of the drawings there is illustrated a deformable coupling of the general type disclosed in patent U.S. Pat. No. 3,429,587 incorporated by reference herein. The coupling is generally designated 10 and comprises an elongated tubular shell 11. Formed near each end of the shell is a deformable annular arch 12 merging with a radially inward recess 13 which together on their opposite face define a gasket recess 14. Contained in the gasket recesses are annular gaskets 15 and 16 in accordance herewith to be described.

Annularly encircling each end portion of the shell is an outer pressure ring 17 secured thereto as by welding or the like. Between the pressure ring and shell there is defined a pressure tight annular passage 18 formed by the exterior spanned surface thereat of shell 11 and the interior surface of ring 17. Connecting passage 18 to exterior of the ring is a port 19 through which the passage is preferably prefilled with a non-compressible fluid such as available forms of automobile grease or the like.

Oppositely received within shell 11 are ends of pipe sections 23 and 24 at least one of which for purposes of disclosure, is of a plastic composition. Moreover, for purposes of description, as will be understood, there is illustrated a transition arrangement, i.e., a coupled joint of plain end plastic pipe 23 to plain end metal pipe 24, which can comprise steel, cast iron, or the like.

4

To form the coupled joint by means of coupling 10 involves applying pressure from a source 25, such as is available from a portable grease gun or the like, through port 19. When sufficient pressure is developed, the shell is constricted radially inward until forged beyond its yield point in compression in effecting a permanent deformation from the relation of FIG. 1 to the relation of FIG. 2. In the latter relation, the shell provides a firm leak tight hold between the gasket and pipe thereat. A forging tool for controlling coupling deformation is disclosed in patent U.S. Pat. No. 3,505,845.

Figure 3:
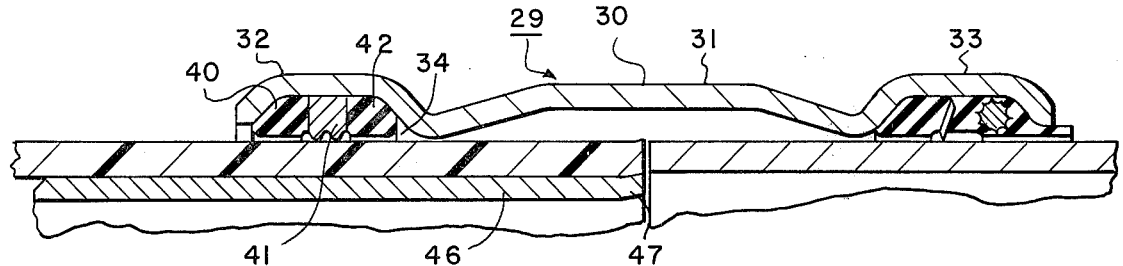
FIGS. 3 and 4 are before and after forming the coupled joint for a second embodiment coupling member in accordance herewith.
Figure 4:
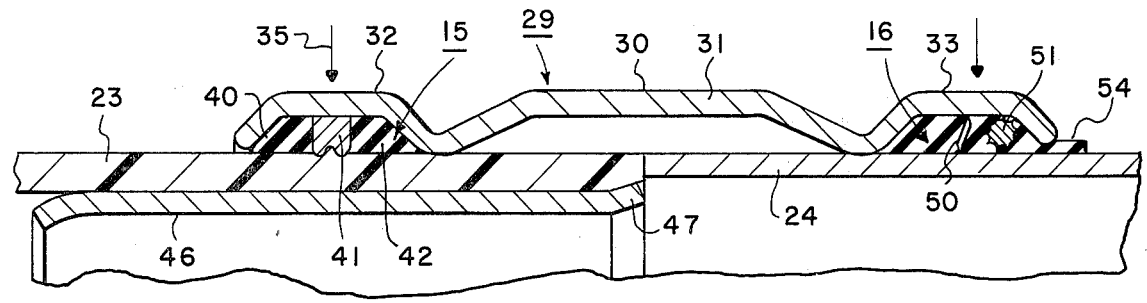

For the deformable coupling embodiment of FIGS. 3 and 4 to which attention is now directed, the coupling member is designated 29 and may, for example, be of a type disclosed in cross-reference application CR-2. Coupling 29 is comprised of an axially elongated, generally tubular, unitary body structure 30 in which pipe sections 23 and 24 are received similarly as above. As more fully disclosed in cross-reference application CR-2, body 30 comprises an axially central non-deformable section 31 between radially enlarged deformable end sections 32 and 33 each defining an internal annular gasket recess 34. Within the gasket recesses, there is contained gaskets 15 and 16 in accordance herewith to be described.

To form the coupled joint with this embodiment, end sections 32 and 33 are concentrically constricted inwardly by application of a uniform hydraulic swaging force. A portable press of a type disclosed in patent U.S. Pat. No. 3,662,450 can be employed for that purpose. It is important to understand, for benefit of the further description to follow, that deformation in the first described embodiment is in the form of catenary relative to the pipe wall in contrast to the parallel deformation of the second embodiment just described. Likewise, the first embodiment is usually preferred for the larger pipe sizes on the order of 4 inches and above.

Gaskets 15 for each of the foregoing deformable coupling embodiments will now be described with reference to FIGS. 1–9. In each of the embodiments gasket 15 is comprised of three loosely assembled and readily separable contiguous tandem segments 40, 41 and 42. Together they form the gasket unit peripherally contoured to accommodate the cross section of the gasket recess provided in the coupling member. Outer two segments, 40 and 42 each comprise an annular material of rubber or other suitable resilient elastomeric sealing composition. Segment 41, axially sandwiched juxtaposed between the others, comprises an inelastic gripping member, preferably of steel, having an initially controlled circumferential extent less than annular. Defining the initial circumferential extent is a gap angle α (FIG. 5) between radial end faces 43 and 44 for reasons as will be understood. On its radial inner face ring 41 is geometrically comprised of axially alternating hills and valleys with the crest of the former defining unsharp serrated gripping teeth 45. For the coupling embodiment of FIGS. 1 and 2, teeth 45 angle obliquely inward as shown in FIG. 6 while for the coupling embodiment of FIGS. 3 and 4 they extend radially as shown in FIG. 7.

Cooperating with each gasket 15 in underlying relation to pipe section 23 is tubular sleeve 46 of metal or other suitable inelastic material initially inserted in the pipe end prior to forming the coupled joint. Sleeve 46 reinforceably supports pipe 23 during the deformation step and may be ferruled on its periphery or may be smooth on its periphery in the manner illustrated. Outermost end 47 of the sleeve is slightly flared to insure accurate positioning within the pipe to at least be in radial alignment with gasket 15.

With either of the described coupling units, deformable constriction thereof toward a coupled relation with plastic pipe end 23 imposes a like constriction on gasket 15. In so doing segments 40 and 42 being constricted inwardly effect a leak tight seal about the pipe while gripping ring 41 is radially contracted to gradually close the gap represented by initial angle α. As contracting of gripping ring 41 continues, its teeth 45 eventually engage and then penetratably dent into the surface of pipe section 23. The result of denting is an axially positive mechanical capture of the plastic pipe end. In the event a pullout or draw force was to be subsequently applied, gasket assembly 15 together with the pipe end insert would, if not prevented, tend to move toward the coupling outlet. Precluding this possibility is the reduced diameter of the outlet to less than either gasket recess 14 or 34, such that the effect of tending to move the gasket in that direction encounters an inclined plane imposing an increased squeeze on the coupled joint. This, in turn, increases both elastomer sealing by segments 40 and 42 while increasing tooth penetration of gripping ring 41 and insert 46 to further enhance capture of the pipe end.

As a limitation, however, it should be recognized that with a draw force of sufficient magnitude, the foregoing, if continued, would ultimately contract the gasket and plastic pipe until of reduced diameter able to emerge together through the coupling mouth. Preventing the latter effect, in accordance herewith, is the limit of radial contraction that can be imposed on gripping ring 41 by virtue of gap angle α. So long as ends 43 and 44 remain spaced apart further radial contraction of ring 41 is possible and can continue. However, on the ends ultimately abutting each other at the split, further radial contraction is prevented with the pipe locked into the coupling. For these reasons, it has been found that the theoretical new OD circle formed by gripping ring 41 when fully contracted with ends abutted as aforesaid, should be of diameter greater than the coupling mouth by at least 1/16 inches. With a fully contracted ring circle diameter always greater than the coupling mouth, pullout in the manner just described is positively precluded. By this means, should increased pullout force be incurred of a magnitude otherwise able to produce tensile failure in the pipe, failure will of necessity occur elsewhere remote from the coupling and not at the coupling itself.

Gasket member 16 for precluding pullout of steel pipe 24 in the above transition arrangement, will now be described with reference to FIGS. 1–4 and 10–12. Like most gaskets employed for coupling service, gasket 16 consists of synthetic or naturally electrically insulating materials, shaped to be received within the coupling recess to in turn envelop pipe end 24. Where desired to maintain electrical conductivity between the pipe end and coupling body, cross pins 50 of a type disclosed in co-pending application CR-1 may be employed. For effecting a pullout resistance comparable to that imposed by gasket 15, there is molded in gasket 16 a plurality of angularly displaced individual roller members 51 each generally extending in a circumferential direction. Six such rollers on 60° centers are illustrated in FIG. 11. Each roller is per se axially linear of approximately ½ and 1 inches in length for 1 ¼ to 2 inch and 4 to 6 inch pipe respectively so as to effect a substantially chordal relation with the deformed coupling wall thereat. Formed about the roller periphery are longitudinally extending sharp ridges or teeth 52 arranged either straight or helically as shown. Preferably the roller diameter is about 65 to 80 percent of the gasket thickness.

For use with the first coupling embodiment, an annular recess 53 is provided on the gasket periphery to accommodate catenary deformation. This insures that elastomeric sealing is obtained before contact is made between the roller and adjacent walls of the coupling and pipe. On either coupling being deformed toward its coupled relation in the manner described, the central tooth portion of each roller bites into the pipe wall while its ends bear against the coupling shell. By using a plurality of independent separate rollers about the periphery in this manner, pipe articulation is enabled in the event the joint is subjected to in-service deflection forces. When a draw-bar force is applied, each roller in tending to move toward the coupling mouth increases its grip without restriction. Gasket 16 may include an axial lip 54 in order to insure proper orientation in the coupling and prevent inadvertent backward assembly. Important to note in connection with this construction is that, unlike gaset 15, teeth 52 of the former are sharp in order to facilitate engagement with the steel pipe surface. By contrast, teeth 45 of gasket 15 are purposely rounded since a cutting engagement is undesirable with the more easily penetrated plastic pipe composition while at the same time wanting to avoid any incipient cracks that sharp teeth might possibly produce.

By the above description there is disclosed a novel pipe coupling member and gasket arrangement affording pipe pullout resistance at least sufficient to offset forces comparable to that contemplated by in-service pipe of plastic composition. By a novel combination of gasket structures, the required sealing force between the coupling and received pipe sections can be readily obtained. At the same time, there is imposed a grip on the pipe of magnitude far exceeding those imposed by similar purpose coupling devices of the prior art without crushing a pipe if of plastic composition. Whereas the invention has been described principally in conjunction with a transition type coupling, i.e., where one of the received pipe ends is of metal and the other is of plastic composition, it should be readily apparent that it is intended that the invention hereof can be readily utilized where both received pipe sections are either of plastic or metal such as steel.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pipe coupling for non-metallic plastic pipe including a radially deformable elongated shell in which to receive a pipe section of non-metallic plastic composition to be coupled, and at least one annular gasket recess defined interior in a deformable section of said shell with at least a portion of said recess forming an inclined plane of reducing dimension extending toward the open end thereof, a gasket contained in said recess and comprising:
   a. a substantially annular first portion of elastomeric composition having a peripheral shape generally conforming to the wall configuration of said recess;
   b. a substantially annular second portion of elastomeric composition having a peripheral shape generally conforming to the wall configuration of said recess; and
   c. a ring-like inelastic third portion of predetermined circumferential extent less than annular having a pipe gripping surface defined on its radially inner face and positioned contiguously juxtaposed in a sandwich relation between said first and second portions said third portion having a radial thickness at least at its radial faces greater than the radial thickness of the contiguous faces of the respective first and second gasket portions thereat and being responsive to deformation of said coupling shell to constrict radially inward into a penetrating gripping engagement with a non-metallic plastic pipe section received thereat while operative in response to a drawbar pull incurred by a gripped pipe section therein acting to urge said third portion past said inclined plane to limit constriction of said third portion for preventing movement of said third portion past said inclined plane and thereby prevent pullout of the gripped pipe section.

2. In a pipe coupling according to claim 1 in which said third portion is subject to a limit of radially inward constriction by an abuttment of its opposed ends initially defining said predetermined circumferential extent.

3. In a pipe coupling according to claim 2 in which said third portion is of metal composition and there is included a metal sleeve adapted to be positioned in a received pipe end in radial alignment with said gasket to reinforce the pipe against the deformation forces applied against said coupling shell.

4. In a pipe coupling according to claim 3 in which each of said first and second portions are loosely assembled and readily separable from said third portion.

5. In a pipe coupling according to claim 3 in which the gripping surface of said third gasket portion comprises axially alternating hills and valleys adapted to engage a pipe surface thereat.

6. In a transition pipe coupling for connecting nonmetallic plastic pipe to metal pipe including a radially deformable elongated shell in which to receive a pipe section to be coupled, and an annular gasket recess defined interior at each opposite shell end in a deformable section of said shell with at least a portion of one said recess forming an inclined plane of reducing dimension extending toward the open end thereof,
   a. a first gasket contained in the one of said recesses and adapted for use with non-metallic plastic pipe comprising:
      1. a substantially annular first portion of elastomeric composition having a peripheral shape generally conforming to the wall configuration of said recess;
      2. a substantially annular second portion of elastomeric composition having a peripheral shape generally conforming to the wall configuration of said recess; and
      3. a ring-like inelastic third portion of predetermined circumferential extent less than annular having a pipe gripping surface defined on its radially inner face and positioned contiguously juxtaposed in a sandwich relation between said first and second portions said third portion having a radial thickness at least at its radial faces greater than the radial thickness of the contiguous faces of the respective first and second gasket portions thereat and being responsive to deformation of said coupling shell to constrict radially inward into a penetrating gripping engagement with a nonmetallic plastic pipe section received thereat while operative in response to a drawbar pull incurred by a gripped pipe section therein acting to urge said third portion past said inclined plane to limit constriction of said third portion for preventing movement of said third portion past said inclined plane and thereby prevent pullout of the gripped pipe section; and
   b. a second gasket contained in the other of said recesses adapted for use with metal pipe and comprising:
      1. a ring of elastomeric composition of geometric cross section generally conforming to the cross sectional configuration of said recess; and
      2. a plurality of individual gripping members centrally embedded within said elastomer and located angularly displaced in a circumferential direction thereabout, each of said gripping members extending in a direction generally normal to the ring axis and having serrations on its periphery extending in a longitudinal direction and responsive to deformation of said coupling to effect a biting grip between the opposing walls of pipe and coupling thereat.

7. In a pipe coupling according to claim 6 in which said gripping members comprise axially linear roller units.

8. In a pipe coupling according to claim 7 in which said serrations extend generally straight and relatively parallel with the axis of said gripping members.

9. In a pipe coupling according to claim 7 in which said serrations generally extend helically about the periphery of said gripping members.

10. In a pipe coupling according to claim 7 in which the roller units are of predetermined axial length adapted to substantially define a chordal relation with the deformed section of said shell.

* * * * *